United States Patent
Klinvex et al.

(10) Patent No.: US 9,312,077 B2
(45) Date of Patent: Apr. 12, 2016

(54) DOUBLE LAYER CAPACITORS

(71) Applicant: CALGON CARBON CORPORATION, Pittsburgh, PA (US)

(72) Inventors: Joseph M. Klinvex, Sewickley, PA (US); Walter G. Tramposch, Moon Township, PA (US); Robert H. Vaughn, Bethel Park, PA (US); Robert P. O'Brien, Bethel Park, PA (US)

(73) Assignee: Calgon Carbon Corporation, Pittsburgh, PA (US)

( * ) Notice: Subject to any disclaimer, the term of this patent is extended or adjusted under 35 U.S.C. 154(b) by 271 days.

(21) Appl. No.: 13/717,497

(22) Filed: Dec. 17, 2012

(65) Prior Publication Data

US 2013/0194720 A1    Aug. 1, 2013

Related U.S. Application Data

(60) Provisional application No. 61/576,597, filed on Dec. 16, 2011.

(51) Int. Cl.
| | |
|---|---|
| *H01G 11/34* | (2013.01) |
| *H01G 11/24* | (2013.01) |
| *H01G 11/32* | (2013.01) |
| *H01G 11/58* | (2013.01) |

(52) U.S. Cl.
CPC .............. *H01G 11/34* (2013.01); *H01G 11/24* (2013.01); *H01G 11/32* (2013.01); *H01G 11/58* (2013.01); *Y02E 60/13* (2013.01)

(58) Field of Classification Search
CPC ....... H01G 11/32; H01G 11/86; H01G 11/34; H01G 11/04; H01G 11/26; H01G 11/38; H01G 11/30; H01G 11/44; H01G 11/58
See application file for complete search history.

(56) References Cited

U.S. PATENT DOCUMENTS

| | | | |
|---|---|---|---|
| 5,204,310 | A | 4/1993 | Tolles et al. |
| 5,356,849 | A | 10/1994 | Matviya et al. |
| 6,225,733 | B1 | 5/2001 | Gadkaree et al. |
| 6,704,192 | B2 | 3/2004 | Pekala |
| 7,236,349 | B2 | 6/2007 | Miyaki et al. |
| 7,342,770 | B2 | 3/2008 | Mitchell et al. |
| 7,616,428 | B2 | 11/2009 | Kobayashi et al. |
| 7,781,099 | B2 | 8/2010 | Yamate |
| 2002/0080553 | A1 | 6/2002 | Pekala |
| 2002/0114126 | A1 | 8/2002 | Hirahara et al. |
| 2004/0246658 | A1 | 12/2004 | Adrianov et al. |
| 2005/0128684 | A1 | 6/2005 | Miyaki et al. |
| 2006/0000071 | A1 | 1/2006 | Dandekar et al. |
| 2008/0160413 | A1 | 7/2008 | Dopp et al. |

(Continued)

FOREIGN PATENT DOCUMENTS

| | | |
|---|---|---|
| GB | 2481509 A | 12/2011 |
| WO | WO 98/26439 | 6/1998 |
| WO | WO 03/041098 A1 | 5/2003 |
| WO | WO 2008/085479 A1 | 7/2008 |
| WO | WO 2010/075054 A1 | 7/2010 |
| WO | WO 2011/053668 A1 | 5/2011 |
| WO | WO 2012/029918 A1 | 3/2012 |
| WO | WO 2012/029920 A1 | 3/2012 |
| WO | WO 2012/032407 A2 | 3/2012 |
| WO | WO 2012/056050 A2 | 5/2012 |

OTHER PUBLICATIONS

International Search Report dated Feb. 28, 2013 for PCT/US2012/070183.

*Primary Examiner* — Dion R Ferguson
(74) *Attorney, Agent, or Firm* — Pepper Hamilton LLP

(57) ABSTRACT

Activated carbons having improved volumetric capacitance and double layer capacitors including these activated carbons are described herein.

14 Claims, 3 Drawing Sheets

(56) References Cited

U.S. PATENT DOCUMENTS

| | | |
|---|---|---|
| 2009/0168305 A1* | 7/2009 | Fleig et al. .................... 361/528 |
| 2010/0150814 A1 | 6/2010 | Gadkaree et al. |
| 2010/0151328 A1 | 6/2010 | Gadkaree et al. |
| 2010/0220429 A1 | 9/2010 | Norieda et al. |
| 2011/0083320 A1 | 4/2011 | Dopp et al. |

* cited by examiner

DOUBLE LAYER CAPACITORS

CROSS-REFERENCE TO RELATED APPLICATIONS

This application claims the benefit of U.S. Provisional Application No. 61/576,597, filed Dec. 16, 2011.

GOVERNMENT INTERESTS

Not applicable

PARTIES TO A JOINT RESEARCH AGREEMENT

Not applicable

INCORPORATION BY REFERENCE OF MATERIAL SUBMITTED ON A COMPACT DISC

Not applicable

BACKGROUND

Not Applicable.

BRIEF SUMMARY OF THE INVENTION

Not Applicable.

DESCRIPTION OF DRAWINGS

For a fuller understanding of the nature and advantages of the present invention, reference should be made to the following detailed description taken in connection with the accompanying drawings, in which.

DETAILED DESCRIPTION

Figure 1:
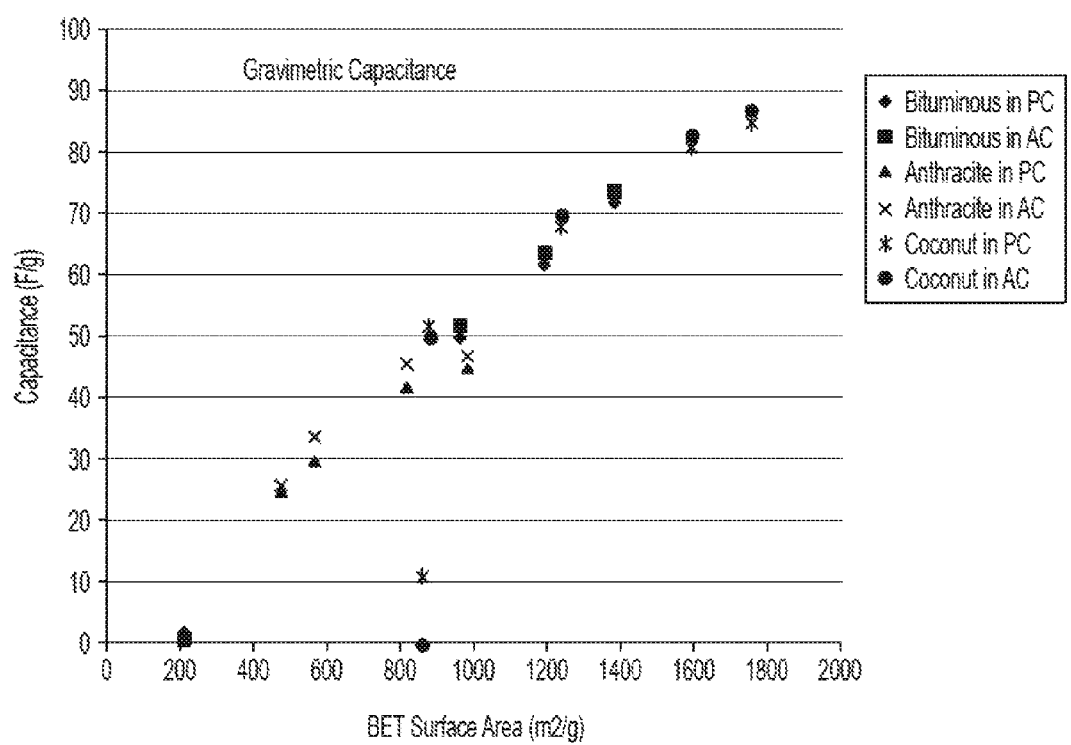
FIG. 1 is a graph showing gravimetric capacitance versus gravimetric surface area for activated carbons prepared from different materials.

It must be noted that, as used herein, and in the appended claims, the singular forms "a," "an," and "the" include plural reference unless the context clearly dictates otherwise. Unless defined otherwise, all technical and scientific terms used herein have the same meanings as commonly understood by one of ordinary skill in the art. Although any methods similar or equivalent to those described herein can be used in the practice or testing of embodiments of the present invention, the preferred methods are now described. All publications and references mentioned herein are incorporated by reference. Nothing herein is to be construed as an admission that the invention is not entitled to antedate such disclosure by virtue of prior invention.

As used herein, the term "about" means plus or minus 10% of the numerical value of the number with which it is being used. Therefore, about 50% means in the range of 45%-55%.

"Optional" or "optionally" may be taken to mean that the subsequently described structure, event or circumstance may or may not occur, and that the description includes instances where the event occurs and instances where it does not.

Activated carbon is widely used in the food industry, chemical industry, pharmaceutical industry and various other industries. In recent years, activated carbon has been used in the electrodes in electrical double layer capacitors. Electrical double layer capacitors that use activated carbon in the electrodes generally exhibit superior electrostatic capacitance, which has made them desirable for use in electronics, electronic device electrode applications, and more recently back-up power supplies in which high-capacitance products are used in the auxiliary power supplies of motors and various regenerative energy storage applications and the like.

Double layer capacitors rely on the formation of an ionic double layer at each of two electrodes when a potential is applied and the capacitor is charged. The total capacitance achievable in the device is related to the surface area of the electrodes by equation 1:

$$C = \frac{eS}{d} \quad (1)$$

Where C is capacitance of the device; S is the surface area of the electrode; e is the dielectric constant; and d is the double layer thickness.

In this equation, e and d are properties of the electrolyte, and S is a property of the material that serves as the electrode. To achieve the highest device capacitance, previous work has focused on maximizing the surface area of the electrode material to attain the highest gravimetric capacitance (F/g) resulting in the highest gravimetric device capacitance. The electrode material has thus been chosen from materials that have a large surface area, and preferred materials have generally been carbon-based materials such as activated carbons, carbon nanotubes, graphenes, and the like because of their high surface areas and chemical stability, which provides stability in the electrolyte system at the voltages applied.

Like electrodes may be used in pairs to produce devices which behave as capacitors and are generally referred to as symmetric double layer capacitors. A single carbon electrode can also be coupled in combination with a faradaic and/or electrochemically active electrode using for example but not limited to containing nickel, lead, lithium, or manganese and their salts to produce devices known as asymmetric capacitors, pseudo capacitors, or hybrid batteries. Carbon electrodes may also be used in split electrode configurations or added to electrodes rather than used alone as an electrode material. The term "capacitor," as used herein, and in the appended claims refers to symmetric capacitors, asymmetric capacitors, pseudo capacitors, hybrid batteries, advanced batteries, and split electrode electrochemical devices.

Embodiments of the invention are directed to activated carbon materials and methods for preparing activated carbon materials for use in double layer capacitors in both symmetric and asymmetric devices. The activated carbons of the invention exhibit a maximum volumetric capacitance (F/cc) and provide improved capacitance at lower surface areas than previously described activated carbon materials used in double layer capacitors.

The activation process relies upon the gasification of the carbonaceous precursor, which leads to increased surface area of the resultant activated carbon. Gasification also results in a reduction in the bulk density of the activated carbon commonly known as the apparent density ("AD") in g/cc. The increase in the surface area leads to an increase in the capacitance of the device as provided in equation (1) given a fixed weight of carbon; however, the accompanied decrease in activated carbon density would require a larger volume of activated carbon to maintain a constant device capacitance based on the gravimetric capacitance (F/g). According to equation (1), increasing the surface area of the activated carbon should result in an increase in device size to accommodate the larger volume of activated carbon. FIG. 1 is a graph showing the relationship of gravimetric surface area (m²/g) to gravimetric capacitance (F/g). As expected, as the BET surface area increases the gravimetric capacitance also increases for all of the materials tested.

Figure 2:
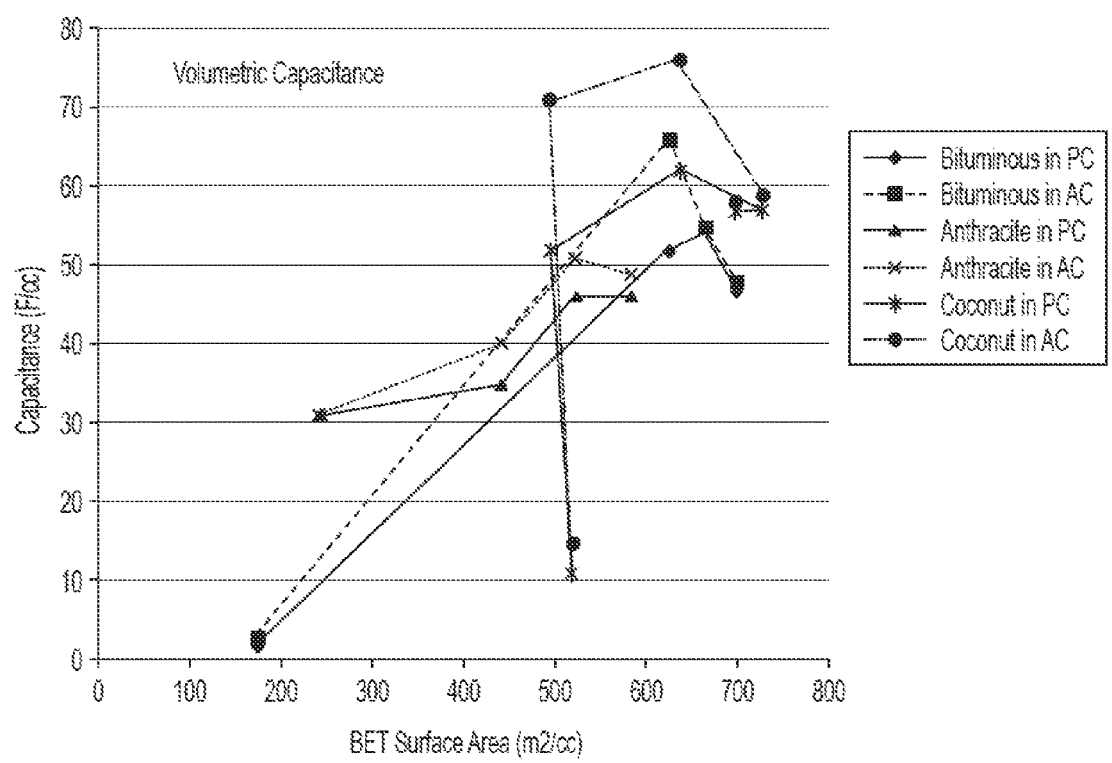
FIG. 2 is a graph showing volumetric capacitance versus volumetric surface area for activated carbons prepared from different materials.

The same relationship would be expected to be evident regardless of the means for determining the surface area of the activated carbon. However, as illustrated in FIG. 2 the linear relationship exhibited when gravimetric surface area (m²/g) is plotted in relation to gravimetric capacitance (F/g) is not apparent. Rather, the volumetric capacitance (F/cc) appears to peak at particular volumetric surface areas (m²/cc), and these peaks appear to vary somewhat depending on the material used to make the activated carbon. "Volumetric surface area" as used herein is defined as the product of the gravimetric surface area in m²/g and the apparent density (AD) in g/cc.

Table 1 shows the surface area of activated carbon materials prepared from various precursors as measured by standard nitrogen adsorption as a function of AD. In general, the lower the AD, the higher the degree of activation and the higher the surface area. As indicated by the BET surface area in m²/g for the three materials also presented Table 1, an increase in the surface area is observed as the material is activated at least for the bituminous and coconut based materials. The anthracite-based material exhibits an increase in surface area followed by a decrease as the material is further activated. This type of behavior is well known to those skilled in the art for materials that are difficult to activate, such as anthracite precursors as they will generally reach a plateau in surface area at a relatively low value and then decline upon further activation. Table 1 also provides the volumetric capacitance (F/cc) as a function of apparent density (AD) of the activated carbon materials in double layer electrodes fabricated using a solvent of propylene carbonate (PC) and acetonitrile (AN) along with a salt.

TABLE 1

|  | Volumetric Capacitance in PC (F/cc) | Volumetric Capacitance in AN (F/cc) | AD (g/cc) | Gravimetric Surface Area (m²/g) | Volumetric Surface Area (m²/cc) |
|---|---|---|---|---|---|
| Bituminous-based |  |  |  |  |  |
| 3346-45F | 2 | 3 | 0.825 | 209 | 172 |
| 3346-45G | 52 | 66 | 0.650 | 960 | 624 |
| 3346-45H | 47 | 48 | 0.584 | 1192 | 696 |
| 3346-45J | 54 | 55 | 0.480 | 1381 | 663 |
| Anthracite-based |  |  |  |  |  |
| 3359-79A | 35 | 40 | 0.780 | 564 | 440 |
| 3359-79D | 46 | 51 | 0.640 | 814 | 521 |
| 3359-79E | 46 | 49 | 0.595 | 978 | 582 |
| 3359-79C-1 | 31 | 31 | 0.511 | 473 | 242 |
| Coconut-based |  |  |  |  |  |
| 3366-39-1 | 11 | 15 | 0.603 | 859 | 518 |
| 3366-40-4 | 52 | 71 | 0.564 | 875 | 494 |
| 3366-39-3 | 62 | 76 | 0.514 | 1236 | 635 |
| 3366-39-2 | 57 | 59 | 0.456 | 1591 | 725 |
| 3366-39-4 | 57 | 58 | 0.397 | 1754 | 696 |

Figure 3:
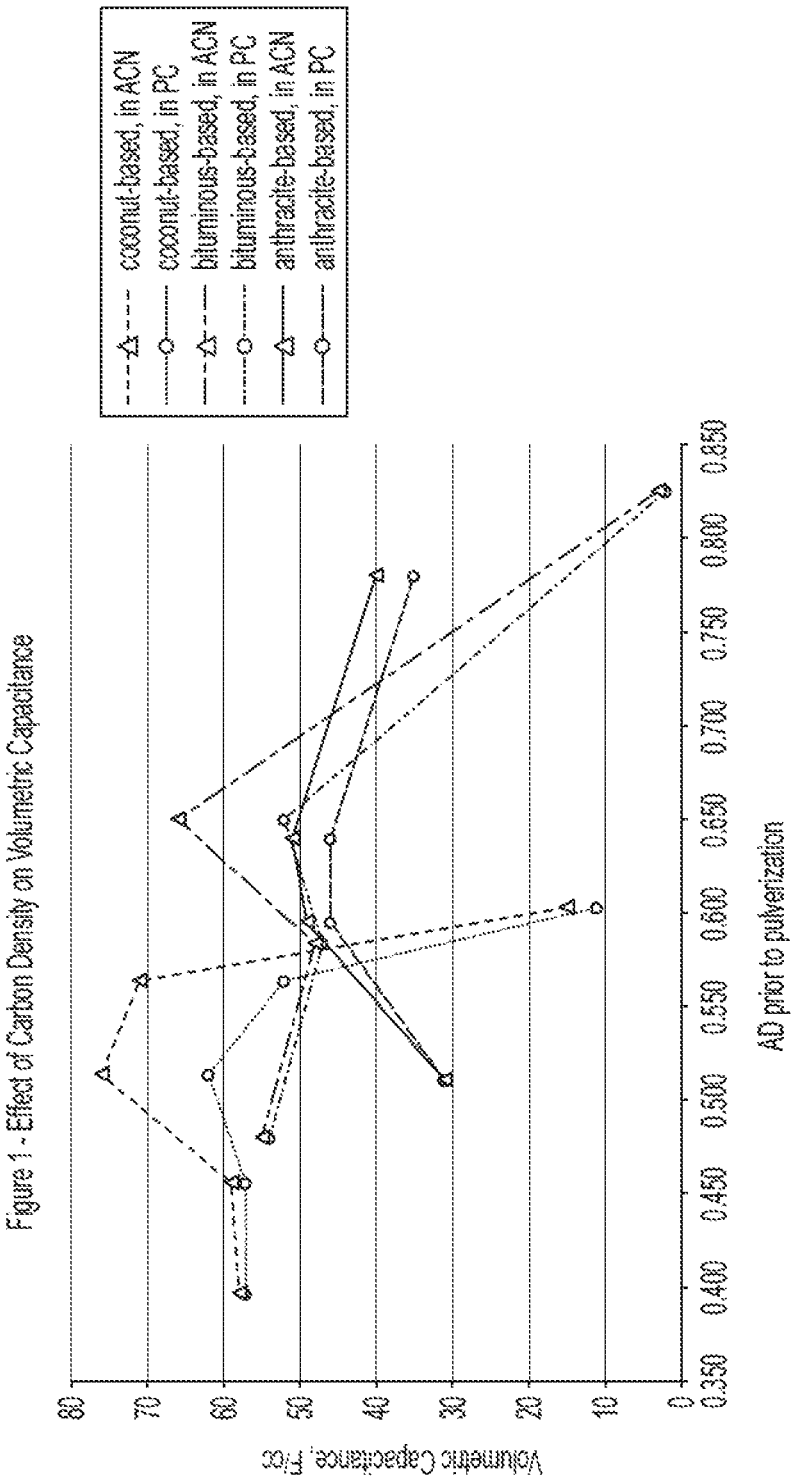
FIG. 3 is a graph showing volumetric capacitance versus apparent density for activated carbons prepared from three different materials and having varying degrees of activation.

The data in Table 1 is graphically provided in FIG. 3. As discussed above, the increase in surface area associated with increased activation would generally be expected to result in an increase in the volumetric capacitance (see equation (1)). However, as indicated in Table 1 and FIG. 1, this does not appear to be the case. Rather, the volumetric capacitance appears to maximize at some intermediate surface area and not at the greatest surface area achieved for each of the three materials tested. Both PC and AN show similar results indicating the effect is not dependent on the electrolyte solvent used. It is therefore reasonable to assume that the effect would be seen for other electrolyte solvents and salts in various combinations. Notably, the degree of the increase in the volumetric capacitance and the area at which the maximum is reached in terms of the AD or activation is also dependent on the material that is activated.

The activated carbon materials described above permit the fabrication of improved high capacitance electrodes including carbonaceous materials that have an optimum degree of activation rather than merely the highest surface area. As discussed above, we show that high surface area materials do not appear to produce the highest capacitance devices when actually reduced to electrodes. This is quite surprising given that one skilled in the art would expect that electrodes manufactured from high surface area materials would also produce the highest capacitance devices. The capacitance provided by the electrodes manufactured with these optimized materials exhibit higher overall capacitance per unit volume. Therefore, these lower surface area materials may allow for the fabrication of reduced volume electrodes and capacitor devices that can be made smaller while retaining excellent capacitance. In addition, the electrodes and capacitor devices of various embodiments may be produced from lower cost raw materials with equivalent capacitance because a high degree of activation is not required and the processing costs of these materials (and others) is greatly reduced since the yields of lower surface area (higher AD) materials is much higher.

Based on the foregoing, various embodiments of the invention are directed to methods for preparing activated carbon having surface areas that exhibit a maximum volumetric capacitance (F/cc), and capacitors including an activated carbon material having maximum volumetric capacitance. For example, the capacitors prepared using such activated carbons having optimized gravimetric (e.g., BET) surface area and AD may generally exhibit a volumetric capacitance of from about 40 F/cc to about 80 F/cc, and in some embodiments, from about 45 F/cc to about 75 F/cc.

The activated carbon of such embodiments may be prepared from any precursor carbonaceous material known in the art including, but not limited to bituminous coal, sub-bituminous coal, lignite coal, anthracite coal, peat, nut shells, pits, coconut, babassu nut, macadamia nut, dende nut, peach pit, cherry pit, olive pit, walnut shell, wood, polymers, resins, petroleum pitches, and any other carbonaceous material or combinations thereof. Additionally, activated carbons produced from various precursors which have been in-use and subsequently reactivated and/or regenerated may be used. As indicated in Table 1, the surface area of activated carbon materials having maximum volumetric capacity may vary depending on the precursor material used to prepare the activated carbon. For example, in some embodiments, the activated carbon may have a gravimetric surface area of from about 300 m²/g to about 2100 m²/g as measured using either the Langmuir, multipoint, or BET methods, and in other embodiments, activated carbon may have a gravimetric surface area of from about 700 m²/g to about 1300 m²/g or about 800 m²/g to about 1100 m²/g using such methods.

The apparent density (AD) of the activated carbon used in the capacitors of various embodiments may also vary and may vary depending on the precursor used to prepare the activated carbon. In general, the activated carbon of embodiments may have an AD of 0.20 g/cc to about 0.80 g/cc. For example, in embodiments in which the activated carbon is prepared from a precursor derived from coal such as, for example, bituminous, sub-bituminous, lignite, and anthracite coal, the AD of the activated carbon may be from about 0.70 g/cc to about 0.55 g/cc, and in some embodiments, from about 0.65 g/cc to about 0.50 g/cc. In embodiments in which the activated carbon is prepared from a precursor derived from a plant material char such as, for example, coconuts, babassu nuts, peach pits, walnuts, cherry pits, or the like, the AD of the activated carbon may be from about 0.40 g/cc to about 0.60 g/cc and in some embodiments, from about 0.45 g/cc to about 0.55 g/cc.

In particular embodiments, the surface area of the activated carbon used in the capacitors of the invention may be determined by volumetric methods. For example, the activated carbon may have a volumetric surface area of from about 400 $m^2/cc$ to about 800 $m^2/cc$ or, in other embodiments, from about 500 $m^2/cc$ to about 700 $m^2/cc$. In still other embodiments, the volumetric surface area may be from about 450 $m^2/cc$ to about 800 $m^2/cc$, about 500 $m^2/cc$ to about 800 $m^2/cc$, about 550 $m^2/cc$ to about 800 $m^2/cc$, about 600 $m^2/cc$ to about 800 $m^2/cc$, about 400 $m^2/cc$ to about 700 $m^2/cc$, about 450 $m^2/cc$ to about 700 $m^2/cc$, about 500 $m^2/cc$ to about 700 $m^2/cc$, about 550 $m^2/cc$ to about 700 $m^2/cc$, about 400 $m^2/cc$ to about 650 $m^2/cc$, about 450 m2/cc to about 650 $m^2/cc$, about 500 $m^2/cc$ to about 650 $m^2/cc$, about 400 $m^2/cc$ to about 600 $m^2/cc$, about 450 $m^2/cc$ to about 600 $m^2/cc$, about 500 $m^2/cc$ to about 600 $m^2/cc$, or any value or range within these ranged. Without wishing to be bound by theory, the volumetric surface area may be more directly related to the maximum capacitance of devices including activated carbon than either gravimetric surface area or apparent or actual density of the activated carbon. Thus, activated carbon made from any precursor that has a volumetric surface area within the ranges identified above may exhibit higher capacitance than lower or higher volumetric surface area activated carbons made from the same materials.

The activated carbon of various embodiments may be of any size appropriate for use in a capacitor. For example, in some embodiments, the activated carbon may have a mean particle diameter of about 20 µm or less, about 10 µm or less, about 5 µm or less, and in certain embodiments, from about 0.1 µm to about 20 µm or about 0.1 µm to about 10 µm. In other applications that require thicker electrodes, for example, asymmetric capacitors or hybrid batteries, larger particle sized materials may be preferred The capacitors of such embodiments may be configured or designed in any way known in the art. For example, in some embodiments, the capacitors may be symmetric double-layer capacitors having two like electrically-conductive electrodes impregnated with an electrolyte and separated by an ion permeable material, wherein the electrically-conductive electrodes include at least one carbonaceous material having an optimized capacitance. In other embodiments, only one electrode or a portion of one electrode would include a carbonaceous material having an optimized capacitance. These devices are known as asymmetric capacitors, hybrid batteries and advanced batteries as previously described. Other embodiments may include mixtures or combinations of optimized capacitance materials with various components such as other capacitive materials, binders, conductivity enhancers, electrochemically active materials, and/or faradaic materials.

The electrolyte may be any electrolyte known in the art. Examples of such electrolytes include such electrochemically stable salts such alkali metal salt, amine salts, tetraalkylammonium salts, tetraalkylphosphonium salts, and the like dissolved in an organic solvent such as propylene carbonate (PC), γ-butyrolactone, acetonitrile (AN), dimethylformamide, 1,2-dimethoxyethane, sulfolane, nitromethane, and the like. In other embodiments, the electrolyte may be an aqueous electrolyte containing a solution of water and inorganic acids such as, but not limited to, sulfuric acid or tetrafluoroboric acid, inorganic bases such as, but not limited to, potassium hydroxide or sodium hydroxide, or inorganic salts. In particular embodiments, the electrolyte may be propylene carbonate (PC) or acetoniltrile (AN) containing tetraethylammoniumtetrafluoroborate (TEATFB) salt.

The ion permeable material between the electrodes can be made of any commercially available materials. Films or membranes of porous polymeric dielectric material can be used which, when coated or impregnated with an electrolyte, permit movement of ions across them. For example, porous membranes, including woven and non-woven forms, of polyethylene, polypropylene, polyethersulfone, fluoropolymers, fiberglass, and the like, can be used, and are selected according to their stability and compatibility with the electrolyte of the capacitor. Polyethersulfone, for instance, is stable in an alkaline aqueous electrolyte, but cannot be used in an acidic aqueous electrolyte. Preferably, the separator membranes are thin, 200 micrometers or less thick, more preferably in the range of 10 to 100 micrometers thick. The membrane resistance in an electrolyte should be in the range 0.1 to 2.0 ohm-cm.

The activated carbon of the various embodiments may be utilized to produce volumetrically smaller devices. For example, optimized volumetric capacitance materials may be used to produce smaller electrodes which would result in the manufacture of smaller capacitor devices.

The activated carbon of various embodiments can be prepared by any method known in the art. In general, such methods may include high temperature treatment of a carbonaceous material to produce highly porous activated carbon and may be performed in a number of different manners including the use of steam, carbon dioxide, or other activating gases known to those skilled in the art. In particular embodiments, carbonaceous precursor materials may be activated by steam at temperatures of from about 1000° F. to about 2200° F., and in particular embodiments, carbonaceous precursor materials may be activated by steam at a temperature of from about 1600° F. to about 2000° F. In particular embodiments, the carbonaceous precursor may be activated by steam at a temperature of about 1750° F.

The duration of the activation may be varied to produce activated carbons of various activities and apparent densities. For example, in some embodiments, the carbonaceous precursor may be activated for from about 20 minutes to about 90 minutes, and in other embodiments, the carbonaceous precursor may be activated for from about 10 minutes to about 120 minutes.

In some embodiments, the activated carbon may be sized by milling. Any means for milling activated carbon such as, for example jet milling, may be used in various embodiments of the invention, and milling may be continued until the activated carbon has reached an appropriate size. For example, in some embodiments, activated carbon may be milled to a mean particle diameter of about 20 µm or less, about 10 μm or less, about 5 μm or less, and in certain embodiments, from about 0.1 μm to about 20 μm or about 0.1 μm to about 10 μm.

In some embodiments, the carbon electrode can be prepared with the use of a binder. Any means can be used to prepare the carbon based electrode including but not limited to solvent based deposition, extrusion or other forming methods produce to appropriately sized electrodes required for the various electrochemical applications.

Further embodiments, are directed to a method for determining the optimal volumetric capacitance of a carbonaceous material for use in capacitors such as those described above. Such embodiments may include the steps of preparing two or more sets of activated carbon materials having different surface areas, different apparent densities, and combinations thereof, and determining the volumetric capacity for each of the sets of activated carbon materials. In some embodiments, the method may further include the step of comparing the volumetric capacities of the sets of activated materials and identifying the surface area and/or apparent density at which the volumetric capacity is highest. In certain embodiments, the step of comparing may be carried out by compiling the volumetric capacities for each of the sets of activated carbon materials in a table and/or plotting the volumetric capacities for each of the sets of activated carbon materials on a graph. The means by which the volumetric capacity is determined may vary among embodiments. For example, in some embodiments, the activated carbon material may be incorporated into a capacitor cell which is used to test the volumetric capacitance. Thus, in certain embodiments, the method may further include the step of preparing an electrode from the each set of activate carbon materials, and in other embodiments, the method may further include the step of preparing capacitor cells from each group of the activated carbon materials.

EXAMPLES

Although the present invention has been described in considerable detail with reference to certain preferred embodiments thereof, other versions are possible. Therefore the spirit and scope of the appended claims should not be limited to the description and the preferred versions contained within this specification. Various aspects of the present invention will be illustrated with reference to the following non-limiting examples.

Example 1

Three different carbonaceous precursors were activated at 1750° F. for various times using steam as the activating gas to provide a representative comparison of the effect of treatment on various materials. Coconut-based materials were produced by activation of a coconut based char, anthracite based material was activated by activation of a sized anthracite coal, and bituminous material was prepared from a reagglomerated bituminous material which had been previously been carbonized to a maximum of 850° F. for 7 hours in air. In other embodiments, the materials may be carbonized at 500° F. to 900° F. for a period of 1 to 10 hours.

The activated carbon materials were pulverized in a ball mill prior to use. The activated carbon materials were dried at 60° C. for 1 hour, and then mixed with a Teflon binder at 3.0% by weight. This mixture was thoroughly blended and formed into sheets. Sheets were rolled to 0.002" thick and punched using a steel die to make discs 0.625" in diameter for testing in symmetric electrochemical capacitor cells. The electrodes to be used in the symmetric cells were dried under vacuum conditions (mechanical roughing pump) at 195° C. for 18 hours. After cooling, the vacuum container holding the electrodes (still under vacuum) was transferred into the drybox, and all subsequent assembly work was performed in the drybox.

The electrode materials were fabricated using an electrolyte of propylene carbonate (PC) or acetoniltrile (AN) that contained 1.0 M of tetraethylammoniumtetrafluoroborate (TEATFB) salt. Two different electrolyte solvents were chosen to determine any that may be solvent specific.

For each cell, electrode discs were placed on specially treated aluminum faceplates and soaked in the organic electrolyte for 10 minutes. A ~0.001" thick disk of NKK separator material was sandwiched between the electrodes and the cell was sealed around the edges using a thermoplastic edge seal material and an impulse heat sealer located directly within the drybox. The aluminum faceplates were specially treated to reduce contact resistance and the thermoplastic heat seal material was selected for electrolyte compatibility and low moisture permeability.

Capacitor cells were conditioned at 1.0 V for ten minutes, measured for properties, then conditioned at 2.0 V for 10 minutes and measured for properties. Charging capacitance was measured at 2.0 V with a 500 ohm series resistance. The measured properties and resulting capacitance are provided in Table 1, above, and FIG. 1.

Gravimetric capacitance (F/g) was determined by dividing the capacitance of constructed cell by the measured weight of the dried carbon electrodes minus any current collector. Volumetric capacitance (F/cc) was determined by dividing the capacitance of the cell by the volume of the carbon electrodes which was determined by measuring the thickness and diameter of the dried carbon electrode minus the current collector and calculating the volume.

What is claimed is:

1. An energy storage device comprising:
   an activated carbon having a volumetric surface area of from about 400 $m^2/cc$ to about 800 $m^2/cc$; and
   an electrolyte;
   wherein the energy storage device comprises a volumetric capacitance of at least 60 F/cc.

2. The energy storage device of claim 1, wherein the activated carbon comprises a volumetric surface area of from about 500 $m^2/cc$ to about 700 $m^2/cc$.

3. The energy storage device of claim 1, wherein the activated carbon comprises a volumetric surface area of from about 450 $m^2/cc$ to about 650 $m^2/cc$.

4. The energy storage device of claim 1, comprising a volumetric capacitance of at least 70 F/cc.

5. The energy storage device of claim 1, wherein the activated carbon is derived from coconut shell, babassu nut shell, macadamia nut shell, dende nut shell, walnut shell, peach pit, cherry pit, olive pit, and combinations thereof.

6. The energy storage device of claim 1, wherein the activated carbon is derived from nut shells, pits, coal, wood, petroleum, petroleum by-products, polymers, resins, and combinations thereof.

7. The energy storage device of claim 1, wherein the activated carbon comprises a mean particle diameter of from about 0.1 μm to about 20 μm.

8. The energy storage device of claim 1, wherein the electrolyte comprises an organic solvent or water.

9. The energy storage device of claim 8, wherein the organic solvent is selected from the group consisting of propylene carbonate (PC), γ-butyrolactone, acetonitrile (AN), dimethylformamide, 1,2-dimethoxyethane, sulfolane, nitromethane acetonitrile (ACN), or combinations thereof.

10. The energy storage device of claim 1, wherein the electrolyte comprises an organic solvent and one or more alkali metal salt, amine salts, tetraalkylammonium salts, tetraalkylphosphonium salts, and combinations thereof.

11. The energy storage device of claim 1 wherein the electrolyte comprises an aqueous electrolyte comprising a solution of water and an inorganic acid, sulfuric acid, tetrafluoroboric acid, an inorganic base, potassium hydroxide, sodium hydroxide, or inorganic salts, or combinations thereof.

12. The energy storage device of claim 1, further comprising a separator membrane.

13. The energy storage device of claim 1, wherein the energy storage device comprises a symmetric electrochemical double layer capacitor.

14. The energy storage device of claim 1, wherein the energy storage device comprises an asymmetric electrochemical double layer capacitor.

\* \* \* \* \*